United States Patent
Wigglesworth et al.

(10) Patent No.: US 11,947,627 B2
(45) Date of Patent: Apr. 2, 2024

(54) CONTEXT AWARE ANOMALY DETECTION

(71) Applicant: International Business Machines Corporation, Armonk, NY (US)

(72) Inventors: Joseph Paul Wigglesworth, Thornhill (CA); Arnamoy Bhattacharyya, Toronto (CA); Cristiana Amza, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 16/940,508

(22) Filed: Jul. 28, 2020

(65) Prior Publication Data
US 2022/0036133 A1    Feb. 3, 2022

(51) Int. Cl.
*G06F 11/00*        (2006.01)
*G06F 11/07*        (2006.01)
(Continued)

(52) U.S. Cl.
CPC ........ *G06F 18/2148* (2023.01); *G06F 11/076* (2013.01); *G06F 11/3024* (2013.01); *G06F 11/3037* (2013.01); *G06F 11/3075* (2013.01); *G06F 11/323* (2013.01); *G06F 18/22* (2023.01); *G06N 3/04* (2013.01); *G06F 2201/84* (2013.01)

(58) Field of Classification Search
None
See application file for complete search history.

(56) References Cited

U.S. PATENT DOCUMENTS 9,082,401 B1 * 7/2015 Fructuoso ............... G10L 13/08
2015/0052090 A1   2/2015 Lin et al.
(Continued)

FOREIGN PATENT DOCUMENTS

CN      110865929 A    3/2020

OTHER PUBLICATIONS

A. Bhattacharyya, S. A. Jokar Jandaghi and C. Amza, "Semantic-Aware Online Workload Characterization and Consolidation," 2018 IEEE 11th International Conference on Cloud Computing (CLOUD), San Francisco, CA, 2018, pp. 210-219.
(Continued)

*Primary Examiner* — Suhail Khan
(74) *Attorney, Agent, or Firm* — Jeffrey M. Ingalls

(57) ABSTRACT

A computer-implemented method for context aware anomaly detection includes receiving a signal including real-time data, dividing the received signal into a set of training wavelets bounded by a respective training context, generating a prediction model for the training context by processing the set of training wavelets through a recurrent neural network to identify patterns in a sequence of data of a respective training wavelet. The method includes, in response to execution of a current context that is different from the training context, extracting current wavelets from a signal of the current context, identifying a pairwise match between same dimensions of the current wavelets and a wavelet pattern of the prediction model by aligning sequences of the current wavelet and sequences of the wavelet pattern of the prediction model. Upon determining that a total cumulative distance between the two sequences exceeds a predetermined threshold, an anomaly is identified.

18 Claims, 9 Drawing Sheets

(51) Int. Cl.
  *G06F 11/30*     (2006.01)
  *G06F 11/32*     (2006.01)
  *G06F 18/214*    (2023.01)
  *G06F 18/22*     (2023.01)
  *G06N 3/04*      (2023.01)

(56) References Cited

U.S. PATENT DOCUMENTS

| | | |
|---|---|---|
| 2017/0004166 A1 | 1/2017 | Biem et al. |
| 2018/0260723 A1 | 9/2018 | Bauer et al. |
| 2019/0081876 A1 | 3/2019 | Ghare et al. |
| 2020/0035325 A1 | 1/2020 | Gao |
| 2020/0076841 A1 | 3/2020 | Hajimirsadeghi |

OTHER PUBLICATIONS

A. Bhattacharyya, S. Sotiriadis and C. Amza, "Online Phase Detection and Characterization of Cloud Applications," 2017 IEEE International Conference on Cloud Computing Technology and Science (CloudCom), Hong Kong, 2017, pp. 98-105.

Bhattacharyya, Arnamoy, Harsh Singh, Seyed Ali Jokar Jandeghi, and Cristiana Amza. "Online detection of anomalous applications on the cloud." In Proceedings of the 27th Annual International Conference on Computer Science and Software Engineering, pp. 161-169. IBM Corp., 2017.

Bhattacharyya, Arnamoy, Weihan Wang, Christine Tsang, and Cristiana Amza. "Semantic-aware anomaly detection in real time parking data." In Industrial Informatics (INDIN), 2017 IEEE 15th International Conference on, pp. 486-491. IEEE, 2017.

Bhattacharyya, Arnamoy, Seyed Ali Jokar Jandaghi, Stelios Sotiriadis, and Cristiana Amza. "Semantic aware online detection of resource anomalies on the cloud." In Cloud Computing Technology and Science (CloudCom), 2016 IEEE International Conference on, pp. 134-143. IEEE, 2016.

Bhattacharyya, Arnamoy, Harsh Singh, Seyed Ali Jokar Jandaghi, and Cristiana Amza. "Online characterization of buggy applications running on the cloud." In Network and Service Management (CNSM), 2016 12th International Conference on, pp. 282-286. IEEE, 2016.

Mell et al., "The NIST Definition of Cloud Computing", Recommendations of the National Institute of Standards and Technology, Special Publication 800-145, Sep. 2011, 7 pages.

International Search Report and Written Opinion for Application #PCT/CN2021/098199, dated Aug. 30, 2021, 9 pages.

Segmented_Dynamic_Time_Warping_Based_Signal_Pattern_Classification.

* cited by examiner

CONTEXT AWARE ANOMALY DETECTION

BACKGROUND

The present disclosure relates to context aware anomaly detection systems and methods of anomaly detection. In particular, the present disclosure relates to systems and methods to automatically determine a context of real-time data, and to detect anomalies from real-time data arriving from one or more data sources and based on the context determination.

Existing approaches in anomaly detection require a user to manually identify the context of the real-time data, and to identify the anomalies present therein. It may be desirable to automate the process of context recognition and anomaly detection, and to thereby reduce the dependence on user provided classification and/or identification of same.

SUMMARY

Embodiments of the present disclosure relate to a computer-implemented method for context aware anomaly detection is provided. The method includes receiving a signal including real-time data, dividing the received signal into a set of training wavelets bounded by a respective training context, generating a prediction model for the training context by processing the set of training wavelets through a recurrent neural network to identify patterns in a sequence of data of a respective training wavelet. The method also includes, in response to execution of a current context that is different from the training context, extracting current wavelets from a signal of the current context, identifying a pairwise match between same dimensions of the current wavelets and a wavelet pattern of the prediction model by aligning sequences of the current wavelet and sequences of the wavelet pattern of the prediction model. The method also includes, in response to determining that a total cumulative distance between the two sequences exceeds a predetermined threshold, identifying an anomaly.

Other embodiments relate to a computer program product utilizing the methods described above.

Other embodiments relate to a computer-implemented method of identifying a context. The method includes receiving real-time data of the context over a time period, setting the context to a first level of granularity, dividing the real-time data into wavelets based on the first level of granularity, and attempting to identify a pattern in the wavelets based on dynamic time warping.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

Figure 1:
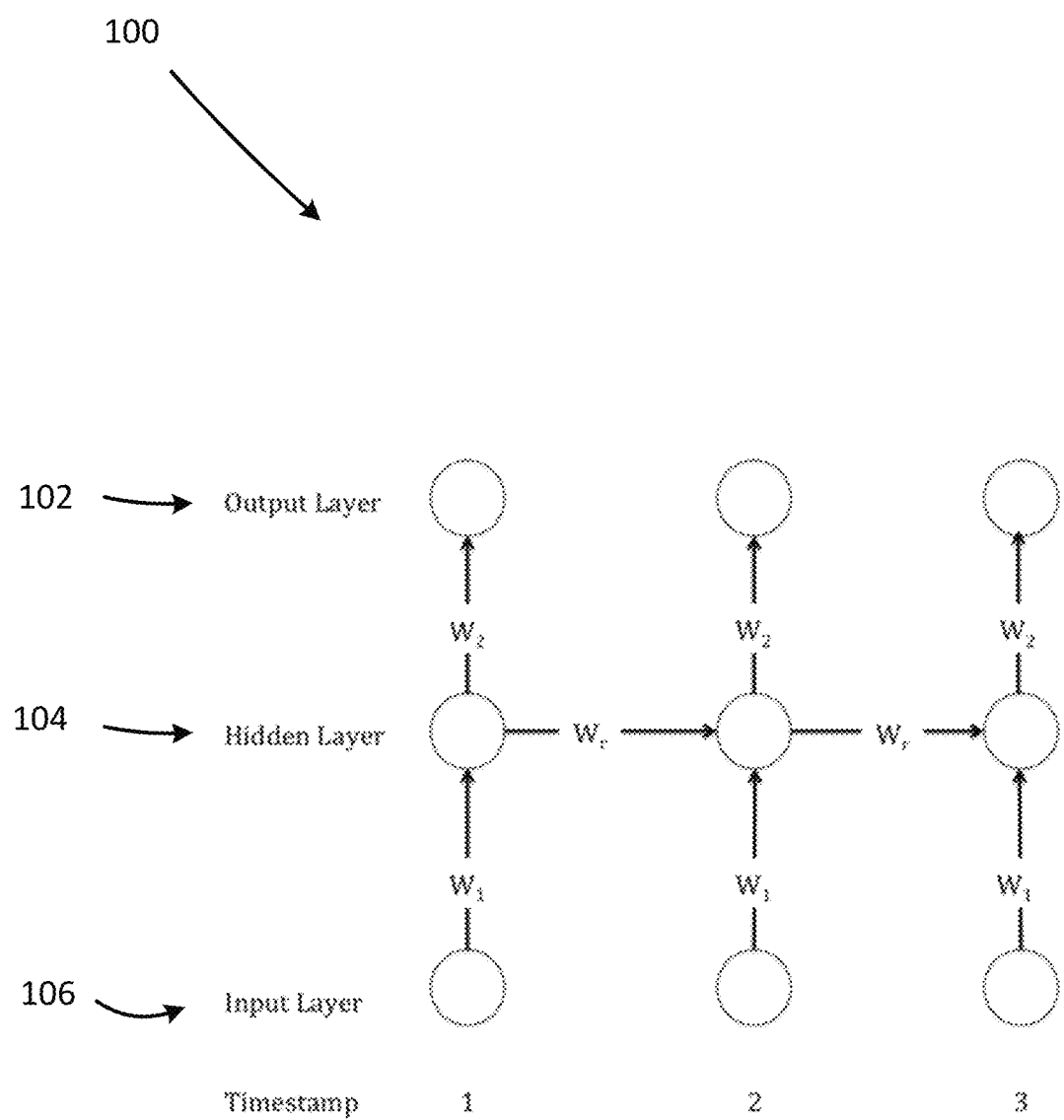
FIG. 1 is a diagram of an example recurrent neural network, according to embodiments.

It should be appreciated that elements in the figures are illustrated for simplicity and clarity. Well-understood elements that may be useful or necessary in a commercially feasible embodiment may not be shown for the sake of simplicity and to aid in the understanding of the illustrated embodiments.

DETAILED DESCRIPTION

The present disclosure relates to context aware anomaly detection method and systems. In certain embodiments, a system is provided that is configured to perform real-time anomaly detection, and to discover these contexts automatically (i.e., without the need for user input).

Data analytics and data science is becoming increasingly popular. With the proliferation of the internet of things (IOT) and sensor devices, and the ever-increasing popularity of cloud computing, the quality of data collected in real-time from all the different components has become important for several reasons. One reason is to ensure that the analysis of the real time data produces useful insights, and that the analysis is not misleading. Another reason is to be able to analyze the performance of systems deployed on the cloud based on real-time performance data, where this real-time data is collected from the cloud infrastructures. Therefore, there is an increasing interest in discovering anomalies from the real-time data so that the erroneous data may be filtered out of the broader data before deriving insights therefrom. Discovering anomalies may also be useful so that malfunctioning components of a system can be identified, which may lead to performance improvements for a system.

Certain embodiments utilize algorithms based on a combination of deep learning (e.g., Recurrent Neural Networks) and signal processing (Dynamic Time Warping) techniques to train a model per context, and then compare the real-time data with a prediction from the existing model to discover anomalies. Certain embodiments also utilize user feedback to dynamically enrich the model, thereby further reducing the rate of false positives (i.e., an erroneous detection of an anomaly) and false negatives.

In general, in time series analysis, dynamic time warping (DTW) is one of the algorithms for measuring a similarity between two temporal sequences, which may vary in speed or duration. DTW has been applied to, for example, temporal sequences of video, audio, and graphics data. Concrete examples that may apply to DTW include speech recognition and signature recognition. However, in a more general sense, DTW may be applied to any data that can be turned into a linear sequence. One of the concepts in DTW is to compare arrays with different lengths, and this may be accomplished by building one-to-many and many-to-one matches, so that the total distance can be minimized between the two. In general, DTW is a method that calculates an optimal match between two given sequences (e.g., a time series) with certain restriction and rules. It should be appreciated that any suitable DTW technique known to a person of skill in the art may be applied to the present embodiments, and specifically to the examples of real-time data streams relating to software programs running on the cloud as well as real-time sensor data collected from Smart Cities.

In the present embodiments, neural networks and other deep learning systems may be utilized to aid in automated context determination and anomaly detection. An Artificial Neural Network (ANN) (also referred to more generally as a neural network) is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex, but on much smaller scales. Such systems progressively and autonomously learn tasks by means of examples, and they have successfully been applied to, for example, speech recognition, text processing and computer vision. A large ANN might have hundreds or thousands of processor units, whereas a mammalian brain has billions of neurons with a corresponding increase in magnitude of their overall interaction and emergent behavior.

Many types of neural networks are known, starting with feedforward neural networks, such as multilayer perceptrons, deep learning neural networks (DNNs) and convolutional neural networks. A feedforward neural network is an artificial neural network (ANN) where connections between the units do not form a cycle. A deep learning neural network is an artificial neural network with multiple hidden layers of units between the input and output layers. Similar to shallow ANNs, DNNs can model complex non-linear relationships. DNN architectures, e.g., for object detection and parsing, generate compositional models where the object is expressed as a layered composition of image primitives. The extra layers enable composition of features from lower layers, giving the potential of modeling complex data with fewer units than a similarly performing shallow network. DNNs are typically designed as feedforward networks.

In certain embodiments described herein, systems, methods and computer program products are provided that use Big Data and Artificial Intelligence (AI) to facilitate anomaly detection with regard to different real-time sources of Big Data (e.g., parking lot occupancy data gathered over time via a plurality of sensors). Machine learning, which is a subset of AI, utilizes algorithms to learn from data (e.g., Big Data) and create foresights based on this data. AI refers to the intelligence when machines, based on information, are able to make decisions, which maximize the chance of success in a given topic. More specifically, AI is able to learn from a data set to solve problems and provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use data, visual recognition, and natural language processing to solve problems and optimize processes.

As used herein, "Big Data" refers to data that is characterized, in part, by large volumes of data (e.g., terabytes, petabytes, etc. in size), a large variety of data (e.g., including structured data, unstructured data, etc.), and different sources of data, etc. An example of structured data is transactional data in a relational database. Examples of unstructured data include images, email data, sensor data, resource monitoring data, etc. Some examples for sources of Big Data include banking information, travel information, medical records, geographical information, transportation system data, passenger data, parking lot occupancy data, resource monitoring data from various layers of a cloud deployment, etc.

As used herein, a "Smart City" generally refers to a metropolitan area that utilizes different types of Big Data, and is collected from a variety of citizens, electronic Internet of Things (IoT) sensors, and other devices. The information is processed and analyzed to monitor and manage different aspects of metropolitan infrastructure such as traffic and transportation systems, power plants, water supply networks, waste management, police and fire departments, information systems, schools, libraries, hospitals, community services, etc. The data may be used to optimize the efficiency of city operations and services, such as efficiently utilizing parking facilities, as discussed herein.

As used herein, a "Smart Home" generally refers to a building (e.g., an office, a residential house, etc.) that utilizes a variety of data collected from IoT sensors, and other devices. Similar to the description of the Smart City above, this information is processed and analyzed to monitor and manage different aspects of, for example, a residential house. The data may be used to monitor and optimize the efficiency of household appliances, services, alarm systems, etc.

In certain embodiments utilizing anomaly detection techniques, real-time data arrives from one or more data sources. In these embodiments, learning the behavior of any event (i.e., a context) occurs in real time. An event can be, for example, a sequence of data occurring over a period of time. In one particular example, the event, or context, may be related to traffic data for certain roads in a city over a period of time, and this may have a pattern over this period of time. Another example of a context, or event, could be for a part of a software application that is running, and you may be tracking the processor usage over time. This processor usage may also exhibit patterns. Once a model for a particular event has been trained in real time, the model may be used to predict the behavior of such events in the future, and the model may be used to identify if the event is behaving normally or abnormally (e.g., whether one or more anomalies exist for a given set of data).

In certain embodiments, the behavior (B) of an event (context) is represented by a n-dimensional signal (captured in real time), where each dimension is representative of time series data collected from a generator (e.g., the time series data may relate to various resource usages for a running process, or it may be data generated from IoT sensors in the case of Smart Homes or Smart Cities). In the present embodiments, the system identifies a pairwise matching (m) between same dimensions $s_i$ and $s_j$ of two signals.

For learning the behavior of each dimension of the signal, a first step is to divide the signal into smaller wavelets bounded by their context (an event). In general, wavelets are mathematical functions that split up data into components with various durations, and these different components are then studied with a resolution matched to its scale. The fundamental idea behind wavelets is to analyze according to scale, and as such, wavelet algorithms process data at different scales or resolutions. If a signal is examined with a large "window," (i.e., a coarse granularity) gross features may be discernable. Similarly, if a signal is examined with a small "window," (i.e., a fine granularity) small features may be noticed. Therefore, the result of wavelet analysis is to see both gross features as well as minute features, in a given context (or event).

In the present embodiments, the contexts are defined depending on the use case. Various methods for discovering contexts is described in below. Once the context is identified and the signal has been divided into smaller wavelets, the present embodiments utilize one or more deep learning techniques (e.g., a recurrent neural network) for learning the pattern of the wavelets.

Referring now to the drawings in which like numerals represent the same or similar elements and initially to FIG. 1, an example of a recurrent neural network 100 is shown. As discussed above, a recurrent neural network is a technique that allows for identification of patterns in a sequence of data. After the wavelets have been formed by chopping the real-time signal according to its context, the wavelets are fed as input into the recurrent neural network 100. For a generated sequence of inputs (i.e., the n wavelets formed after the decomposition of the context) for an output $y^j$ for a given resource, the inputs are denoted by $x^j$ for the jth input (j=1, 2, . . . , n). In this example, the corresponding jth output is calculated via the following Equation 1:

$$y^j = Wx^j + W_r y_{j-1} \qquad \text{Equation 1.}$$

A weight matrix ($W_r$) incorporates the output at the previous step linearly into the current output. In certain architectures, there is an input layer 106, a hidden layer 104 and an output layer 102. In this example, the hidden layer 104 is recurrently connected to itself. Let $h^j$ denote the hidden layer 104 at timestep j. The formulas are represented by Equations 2, 3 and 4:

$$h^0 = 0 \qquad \text{Equation 2}$$

$$h^j = \sigma(W_1 x^j + W_r h^{j-1}) \qquad \text{Equation 3}$$

$$y^j = W_2 h^j \qquad \text{Equation 4.}$$

In the equations above, σ is a suitable non-linearity/transfer function like the sigmoid. $W_1$ and $W_2$ are the connecting weights between the input layer 106 and the hidden layer 104, and between the hidden layer 104 and the output layer 102. $W_r$ represents the recurrent weights.

The recurrent neural network 100 workflow is demonstrated in FIG. 1. Running the recurrent neural network 100 over the n training wavelets generates a prediction model for a given context. Using this model, the behavior may be predicted for the next time the context occurs, or anomalies may be detected in future occurrences of the context.

Anomaly detection using wavelet matching for a recurrent neural network (RNN) is now described. During the execution of a context/event, wavelets may be extracted from the real-time signal for that particular context. Then Dynamic Time Warping (DTW) is used to identify the matches between the current wavelet and the wavelet pattern that has been learned from the previous executions of the context. As mentioned above, DTW is a signal processing technique or set of algorithms for measuring a similarity between two temporal sequences, which may vary in speed or duration. During the matching calculation between two wavelets, both the wavelets will have d data points in them. In one example, the wavelets $T_i$ and $P_i$ consist of the following sampled values represented by Equations 5 and 6:

$$T_i = t_1, t_2, \ldots, t_d \qquad \text{Equation 5}$$

$$P_i = p_1, p_2, \ldots, p_d \qquad \text{Equation 6.}$$

To align these two sequences using DTW, a d-by-d matrix is first constructed where the (i-th, jth) element of the matrix corresponds to the squared distance, $d(t_i, p_j) = (t_i, p_j)^2$, which is the alignment between points $t_i$ and $p_j$. To find the best match between these two sequences, a path is retrieved through the matrix that minimizes the total cumulative distance between them. In particular, the optimal path is the path that minimizes the warping cost, and this is represented by Equation 7:

$$DTW(T, P) = \min\left\{\sqrt{\sum_{k=1}^{K} w_k}\right\}. \qquad \text{Equation 7}$$

In Equation 7, $w_k$ is the matrix element $(i,j)_k$ that also belongs to the k-th element of a warping path W, a contiguous set of matrix elements that represent a mapping between T and P. This warping path can be found using dynamic programming to evaluate the following recurrence represented by Equation 8.

$$\gamma(i,j) = d(t_i, p_j) + \min\{\gamma(i-1,j-1), \gamma(i-1,j), \gamma(i,j-1)\} \qquad \text{Equation 8.}$$

In Equation 8, d(i,j) is the distance found in the current cell, and γ(i, j) is the cumulative distance of d(i, j) and the minimum cumulative distances from the three adjacent cells. At the end of the DTW algorithm, a minimum distance $dist_{min}$ is determined that will warp T to P. The lower the distance, the more similar the signals are.

In certain embodiments, there is a predetermined threshold that is set to discover the matching between two wavelets. In some embodiments, this threshold may be constantly modified based on user feedback.

Figure 2:
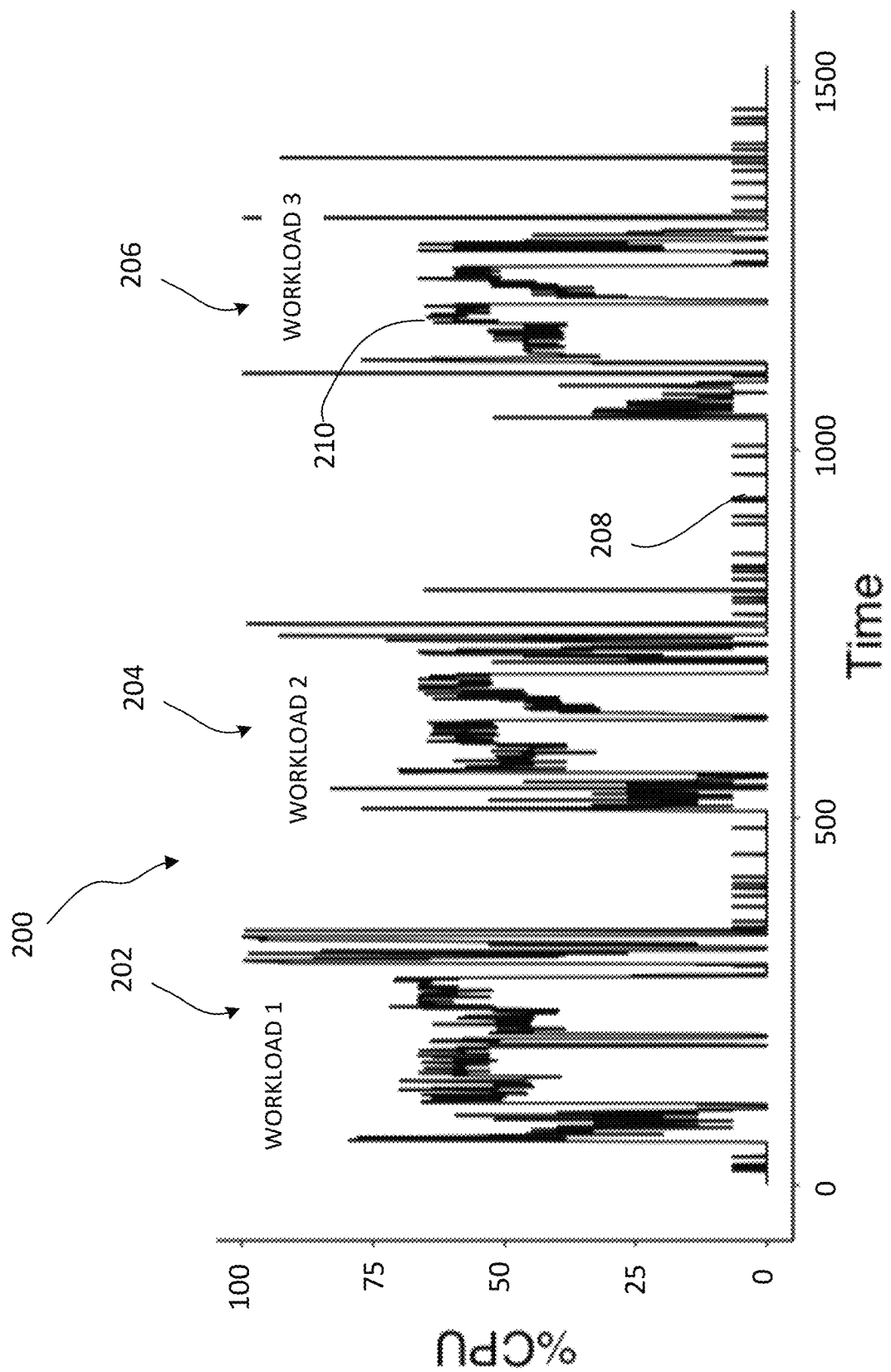
FIG. 2 is a graph of real-time data for the different phases of one example of a long running database server, according to embodiments.
Figure 3:
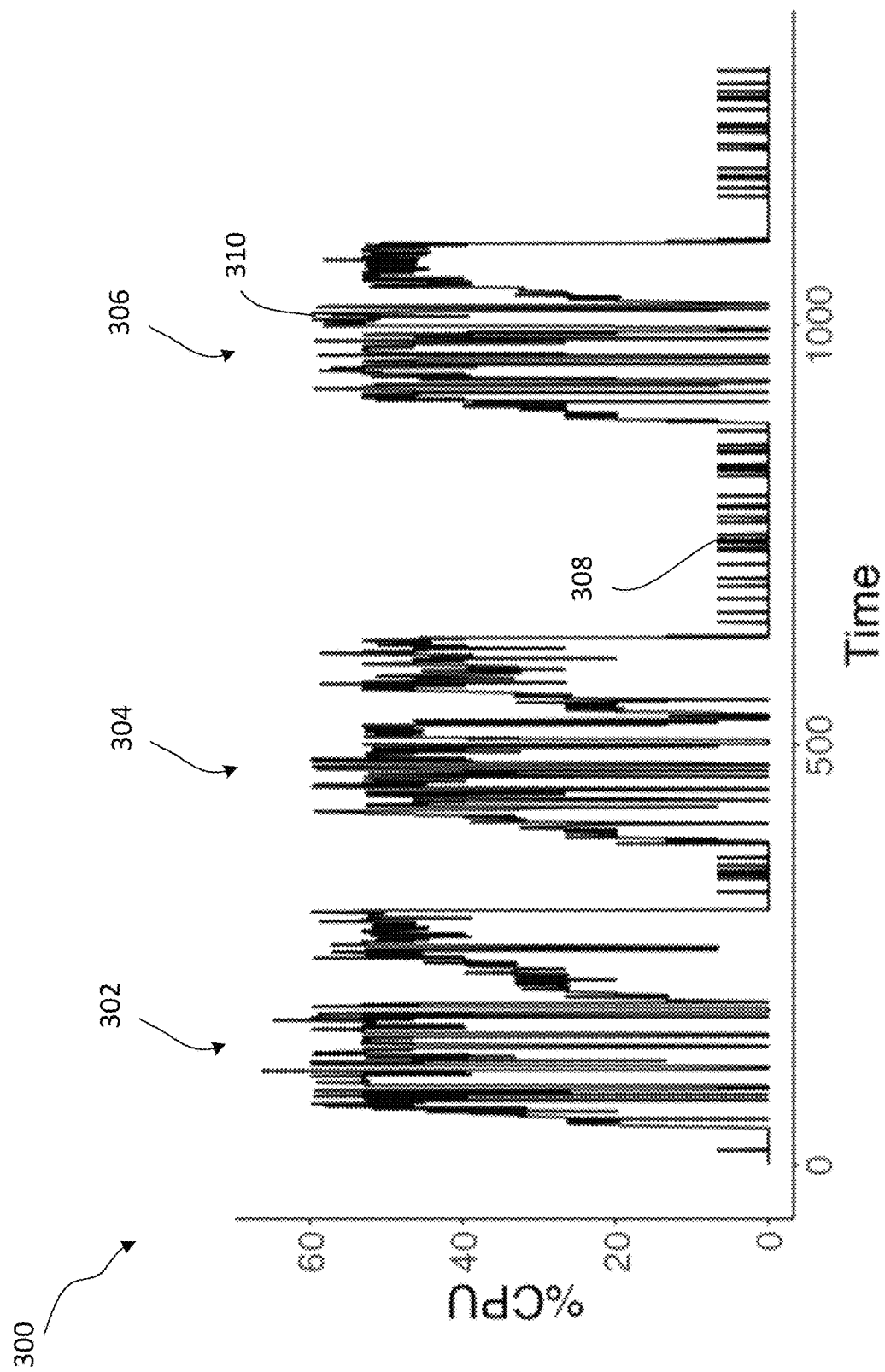
FIG. 3 is a graph of real-time data for the different phases of one example of a long running database server, according to embodiments.

In certain embodiments, automatic context discovery is utilized for a software context. In these embodiments, boundaries may be put on real-time data to extract wavelets from real-time resource usage data for a running server software. While deployed on the cloud, a server goes through different phases. Referring now to FIG. 2, this figure depicts an example of the different phases of a long running HBase database server 200. FIG. 3 depicts an example of different phases of a long running MongoDB database server 300. FIGS. 2 and 3 both show the CPU utilization traces (captured stack traces of the different functions that the workload is executing) of these two servers sampled at 100 HZ frequency. Three different workloads (see, FIG. 2 elements 202, 204, 206, and FIG. 3 elements 302, 304, 306) are run on those two servers (see, FIG. 2 HBase database server 200, and FIG. 3 MongoDB database server 300) while capturing the CPU traces.

FIGS. 2 and 3 show two interesting facts. First, both of the servers go through two major phases when the workload runs, an idle phase (see, FIG. 2 element 208, and FIG. 3, element 308) and a busy phase (see, FIG. 2 element 210, and FIG. 3, element 310). Also, there are microphases within these two major phases. For example, during the idle phase of both the servers, there are occasional spikes in the CPU utilization providing an indication of some work being done by the servers. Depending on the server, the work being done may vary. Second, for the same workload, the CPU utilization of the different servers are different. For example, for the same workload1, the CPU utilization pattern of HBase database server 200 differs from that of MongoDB database server 300. The present embodiments identify the phase boundaries (contexts) from the CPU utilization time series data so that the recurring pattern for that phase can be learned using a recurrent neural network, as described above.

In the present embodiments, automatic identification of the phase boundaries may be determined by utilizing program snapshots. In certain embodiments, the program snapshot (s) at a given time is defined by the following tuple represented by Equation 9:

$$s=(t{:}c{:}m)|s\in \mathbb{S} \qquad \text{Equation 9.}$$

In Equation 9, t is the thread-dump, c is the CPU utilization, and m is the memory utilization of the program at a given time. Based on this definition of a snapshot, the phase p of a program may be defined as the following tuple represented by Equation 10:

$$p=(s_{begin}{:}s_{end})|s_{begin},s_{end}\in \mathbb{S}, p \in \mathbb{P} \qquad \text{Equation 10.}$$

The present embodiments may identify phase changes during the application run using periodically collected snapshots. In certain examples, a phase change is detected when there is a significant change in two consecutively collected snapshots of a program. For change detection in program snapshots, a sliding window based approach is utilized. During analysis, phases of applications are identified online, and thread-dumps are collected for a sliding window of size w. Each window of w thread-dumps has a set of w three-dimensional datapoints. In this example, the three dimensions are: the set of functions in the thread-dumps; the CPU utilization; and the memory consumption. To transform the set of functions in the thread-dumps of an application to a real number so that it can be used to identify phase changes, the following metric represented by Equation 11 is utilized:

$$stack_{sim} = \frac{\text{num\_elements}(t_{prev} \cap t_{cur})}{\text{num\_elements}(t_{cur})}. \qquad \text{Equation 11}$$

The metric $stack_{sim}$ represents how different the set of functions in the current state of the program ($t_{cur}$) are relative to the previous observed set of functions ($t_{prev}$). In one example, a $stack_{sim}$ value of $stack_{sim}=1.0$ represents no change while a value $stack_{sim}<1.0$ represents a change in the contents of the stack trace.

After calculating the $stack_{sim}$ value at the current time quantum, a complete representation of the snapshot of the program at that quantum is generated, with all the dimensions being in the real number domain. For detection of a change in phases, the present embodiments mathematically determine whether the current snapshot is an outlier in the window of w last collected snapshots. In certain embodiments, a Principal Component Analysis (PCA) based technique is used for determining whether the current snapshot is an outlier. An outlier identifies a phase change and provides a boundary of where the real-time signal has to be bounded to identify the context.

In certain of the embodiments described above, automatic context discovery and anomaly detection is utilized for software contexts. However, in other embodiments, automatic context discovery and anomaly detection is utilized with regard to real-time sensor data in the use case of Smart Cities. In one example of real-time data from a Smart City, the data is car occupancy collected through sensors from parking lots at various locations in the Smart City. However, it should be appreciated that the parking lot data is merely one example of Smart City data, and other sources of data may be used. In this example, the parking data for each garage (i) consists of data for (m) months and is represented by the following Equation 12:

$$occ_i=\{mon_1,mon_2,\ldots,mon_m\} \qquad \text{Equation 12.}$$

Each set of monthly parking data $mon^i_j$ has (d) sets of data points, depending on the number of days that month has. The form for monthly data is represented by Equation 13:

$$mon^i_j=\{day_1,day_2,\ldots,day_d\} \qquad \text{Equation 13.}$$

Finally, in this example, each set $day_k$ has w⇐288 data points, when data is collected at five minute intervals in real-time. To discover the context for real-time sensor data, context discovery is started from a coarse granularity, and then searching is performed for repetitive patterns of wavelets with finer granularities.

Figure 4:
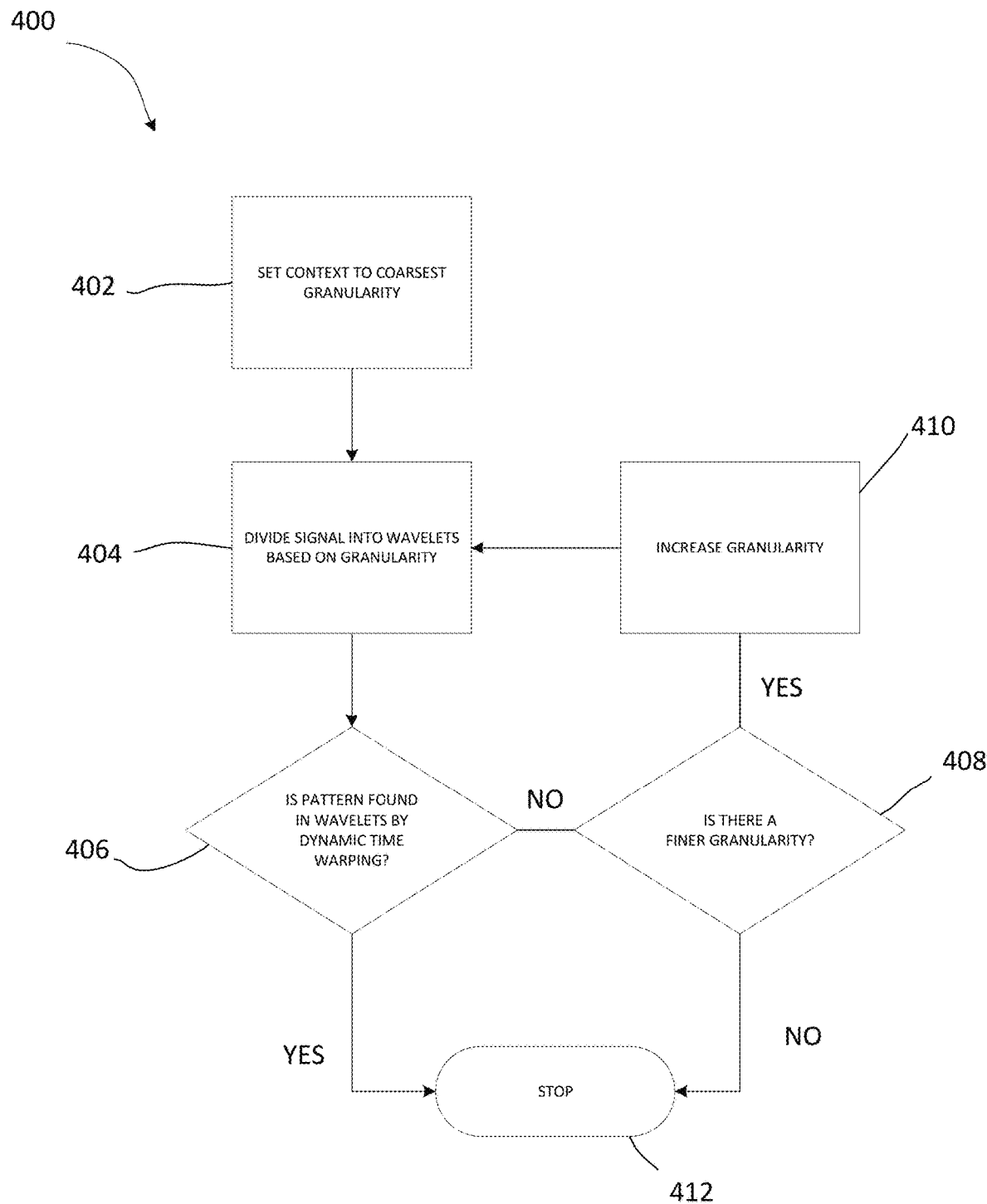
FIG. 4 is a flow chart illustrating a method of determining a context, according to embodiments.

Referring now to FIG. 4, an example method 400 of determining patterns in real-time data is shown. In operation 402, the context is set to a coarsest granularity (e.g., months in this particular use case), and then at operation 404 the signal is divided into wavelets according to that context. Then, at operation 406, dynamic time warping is used to see if there is any pattern in those wavelets. If there is a pattern (operation 406: YES), the context discovery system stops at operation 412. If there is no pattern found, the system determines whether there is a finer level of granularity that can be applied to divide the wavelets at operation 408. If there is a finer level of granularity available (operation 408: YES), the process increases the level of granularity at operation 410 (sets the granularity to be more fine), and then continues its search in the next level of finer granularity (e.g., weeks) by returning to operation 404. At this stage, the method 400 once again searches for repetitive patterns for all combinations of sequences of, for example, weeks (i.e., rather than months) for the same time range of data. As this search is highly parallelizable, the searches (i.e., different searches at different granularities) may be conducted in parallel to greatly reduce the overall processing time. For example, for discovering repetitive patterns in a weekly context, the signals may be divided into the following wavelets if the week indexes are given as w={1, 2, 3, 4}. In the example of analyzing data from 4 months' worth of real-time data, the indexes to form wavelets for pattern discovery may be represented by Equations 14 and 15:

$$\{w1\_m1,w1\_m2,w1\_m3,w1\_m4\},\{w2\_m1,w2\_m2, w2\_m3,w2\_m4\} \qquad \text{Equation 14.}$$

$$\{w1\_m1,w2\_m1,w1\_m2,w2\_m2,w1\_m3,w2\_m3, w1\_m4,w2\_m4\} \qquad \text{Equation 15.}$$

In certain embodiments, all such combinations are searched for lengths up to (n−1) if there are n finer contexts. Therefore, in this case, searching is performed until {w1, w2,w3}, {w2,w3,w4}, {w1,w3,w4} for all four months (i.e., in this case, n=4). Next, searching is continued in a similar fashion to a finer context (days and hours). Once searching has been completed for all patterns in all contexts (i.e., until the finest level of granularity has been reached, for example, hourly in this use case), the process is ended at operation 412, and the match values are ranked. The highest ranked match value is then designated as the discovered repetitive pattern. In certain embodiments, the system may be retrained from time to time to discover new patterns as new real-time data arrives.

Using context information on top of real-time data, the present embodiments may successfully identify anomalies in both software application workload data and Smart City data. As mentioned above, although the examples of software data and Smart City data are described, the present embodiments may be applied to any other suitable source of real-time data. Experiments have been performed to analyze multiple popular software programs that are used in the cloud (e.g., Cassandra, MongoDB, Spark, etc.) to identify contexts in them. These experiments have shown that the context aware anomaly detection is able to identify significant anomalies with 100% accuracy, and with less than 10% false positives.

Figure 5:
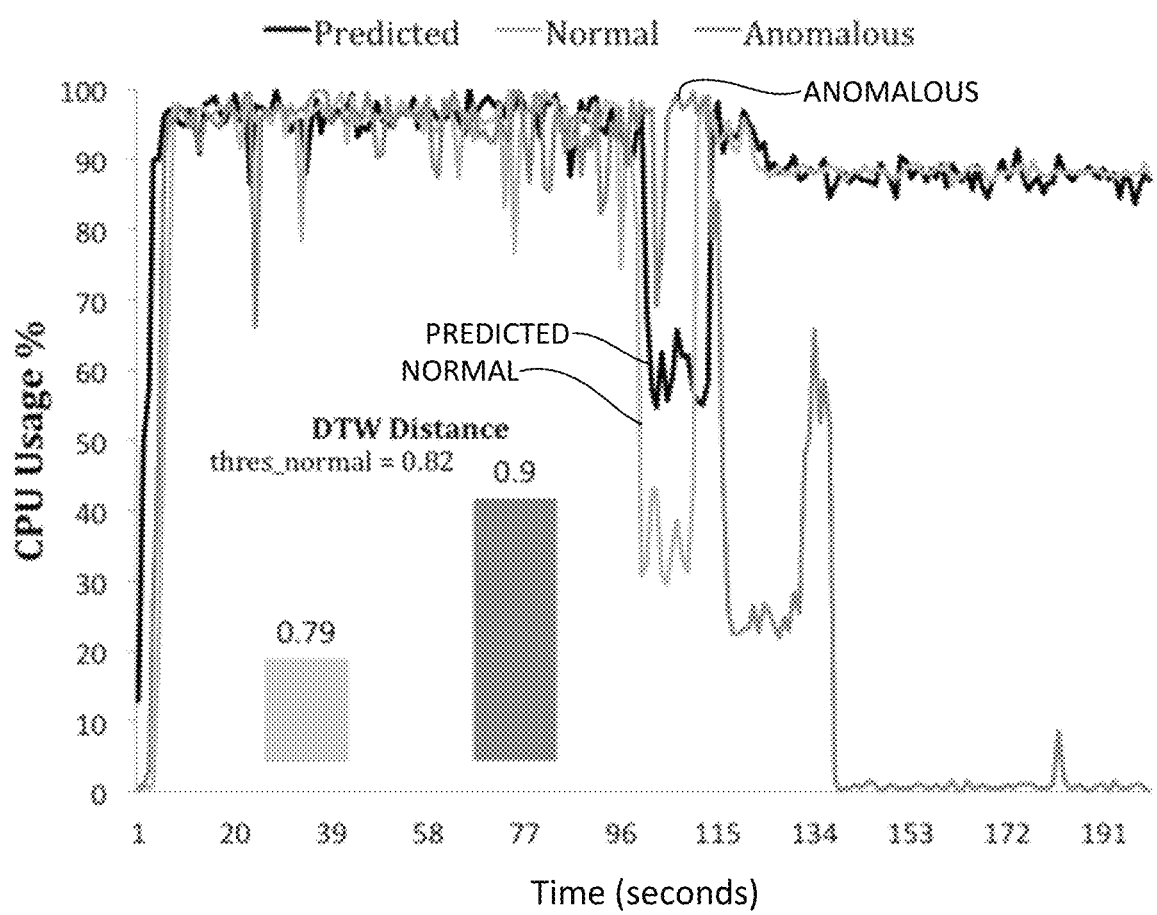
FIG. 5 is a graph showing a comparison between a learned wavelet pattern using a recurrent neural network and an anomalous wavelet pattern, according to embodiments.

Referring now to FIG. 5, this figure shows an example of such a wavelet learned from a context while running a workload on a Cassandra database server. The predicted wavelet (i.e., the darkest black line) shows the learned pattern using a recurrent neural network, and the anomalous run (i.e., the lightest gray line) that is the result of a faulty disk. FIG. 5 therefore shows a visual difference between the learned pattern and the anomalous run. The significant differences in DTW values confirm that the visual inspection coincides with the anomaly detected automatically by the methods of the present embodiments.

The detected anomaly can automatically be removed from the data, which advantageously may remove its influence from insights determined, automatically or by a human, from that data. In some embodiments, after detecting the anomaly, the system may alert a user of the anomaly. This may be in addition to, or instead of, removing the anomalous data. The user may then decide what to do (e.g., remove the anomalous data, determine whether it is caused by faulty components, etc.).

Figure 6:
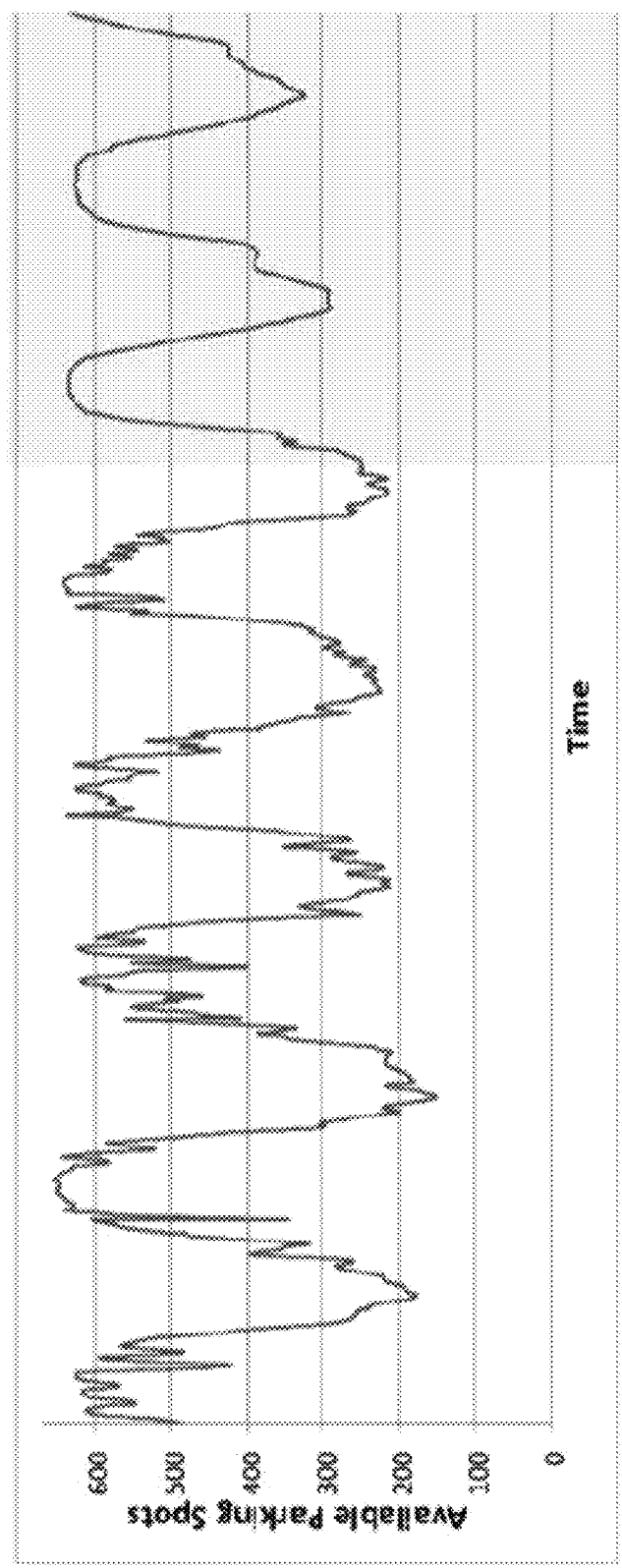
FIG. 6 is a graph showing an example of a wavelet pattern changing from a normal state to an anomalous state, according to embodiments.

Referring now to FIG. 6, this figure shows an example of the real-time parking data collected from a garage where the context is discovered as weekdays. The gray portion of the figure shows the anomalous wavelets for 2.5 days in real-time. Visual inspection confirms the presence of the anomaly, as the data from these two days show a upward trend in the minimum values as compared to the historical data. Using the context-sensitive anomaly detection method of the present embodiments, achievements of up to 40% (or more) improvement in prediction accuracy and up to 50% (or more) reduction in the amounts of false positives as detected can be achieved, when compared to existing anomaly detection methods. In certain embodiments, the sensitivity to anomaly detection is tunable to either be more aggressive or more relaxed, based on user feedback.

The present embodiments have described the details of automatically identifying contexts in real time-data in two scenarios. Methods to discover contexts in cases of software programs running on the cloud, methods to discover contexts in the cases of real-time sensor data collected from Smart Cities. The addition of the discovered context helps improve the prediction accuracy, and also reduces the amounts of false positives that are detected (i.e., relative to existing methods that do not consider contexts). Further, the addition of the discovered context may help reduce resource utilization of the anomaly detection systems (e.g., by increasing the accuracy, the amount of unnecessary confirmation or correction is reduced). It should be appreciated that the present embodiments are not limited to the examples of software running in a cloud environment or to smart city data collection, and the embodiments may be applied to any suitable example of a real-time data feed.

Figure 7:
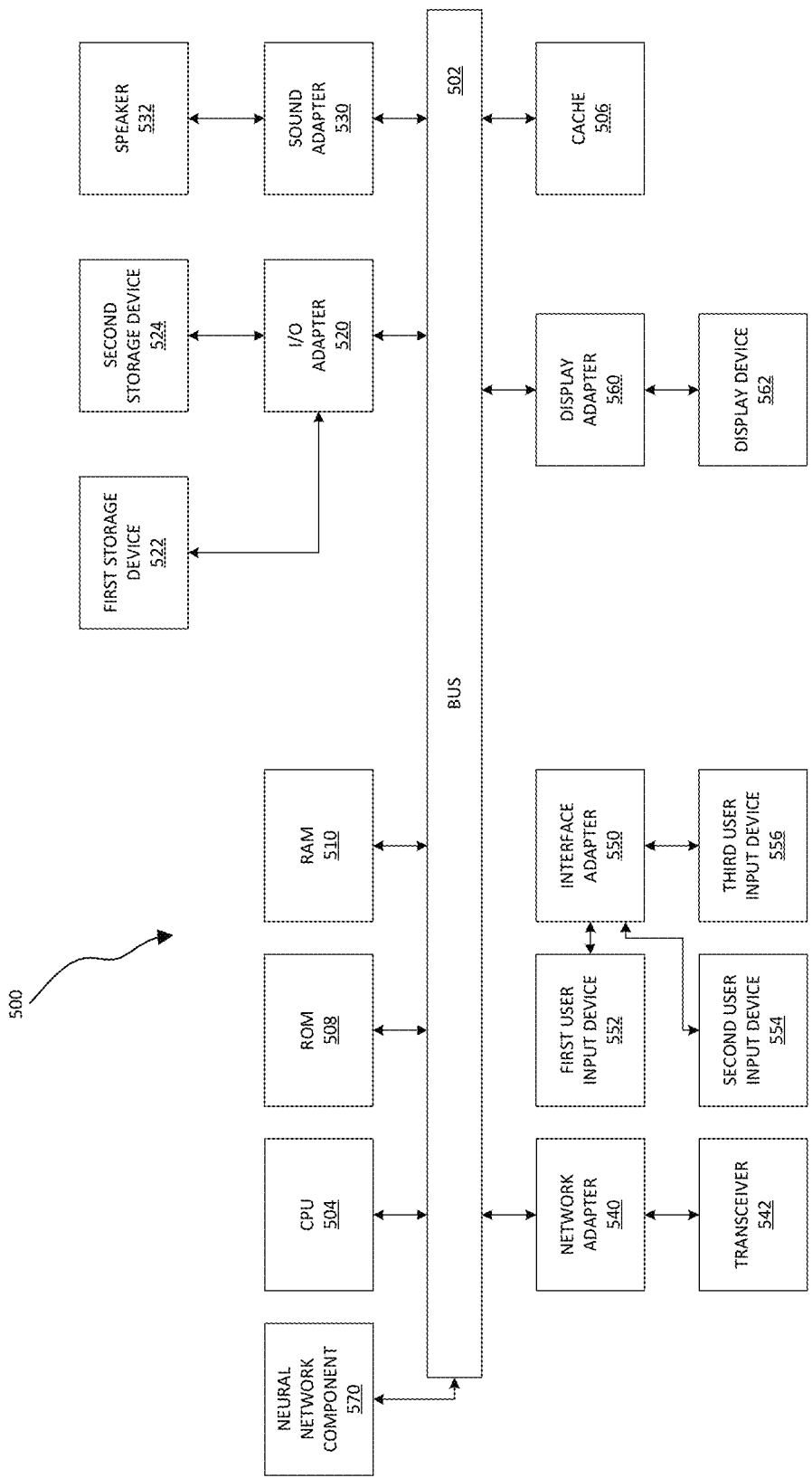
FIG. 7 is a block diagram of a processing system, according to embodiments.

Referring now to FIG. 7, an exemplary processing system 500 to which the present embodiments may be applied is shown in accordance with one embodiment. The processing system 500 includes at least one processor (CPU) 504 operatively coupled to other components via a system bus 502. A cache 506, a Read Only Memory (ROM) 508, a Random-Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 may be any of a disk storage device (e.g., a magnetic or optical disk storage device), a solid-state magnetic device, and so forth. The storage devices 522 and 524 may be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 may be any of a keyboard, a mouse, a keypad, an image capture device, a motion sensing device, a microphone, a device incorporating the functionality of at least two of the preceding devices, or any other suitable types of input devices. The user input devices 552, 554, and 556 may be the same type of user input device or different types of user input devices. The user input devices 552, 554, and 556 are used to input and output information to and from system 500. In certain embodiments, neural network component 590 with a context and anomaly detection mode is operatively coupled to system bus 502.

The processing system 500 may also include other elements (not shown), as readily contemplated by one of skill in the art, as well as omit certain elements. For example, various other input devices and/or output devices may be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present disclosure provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
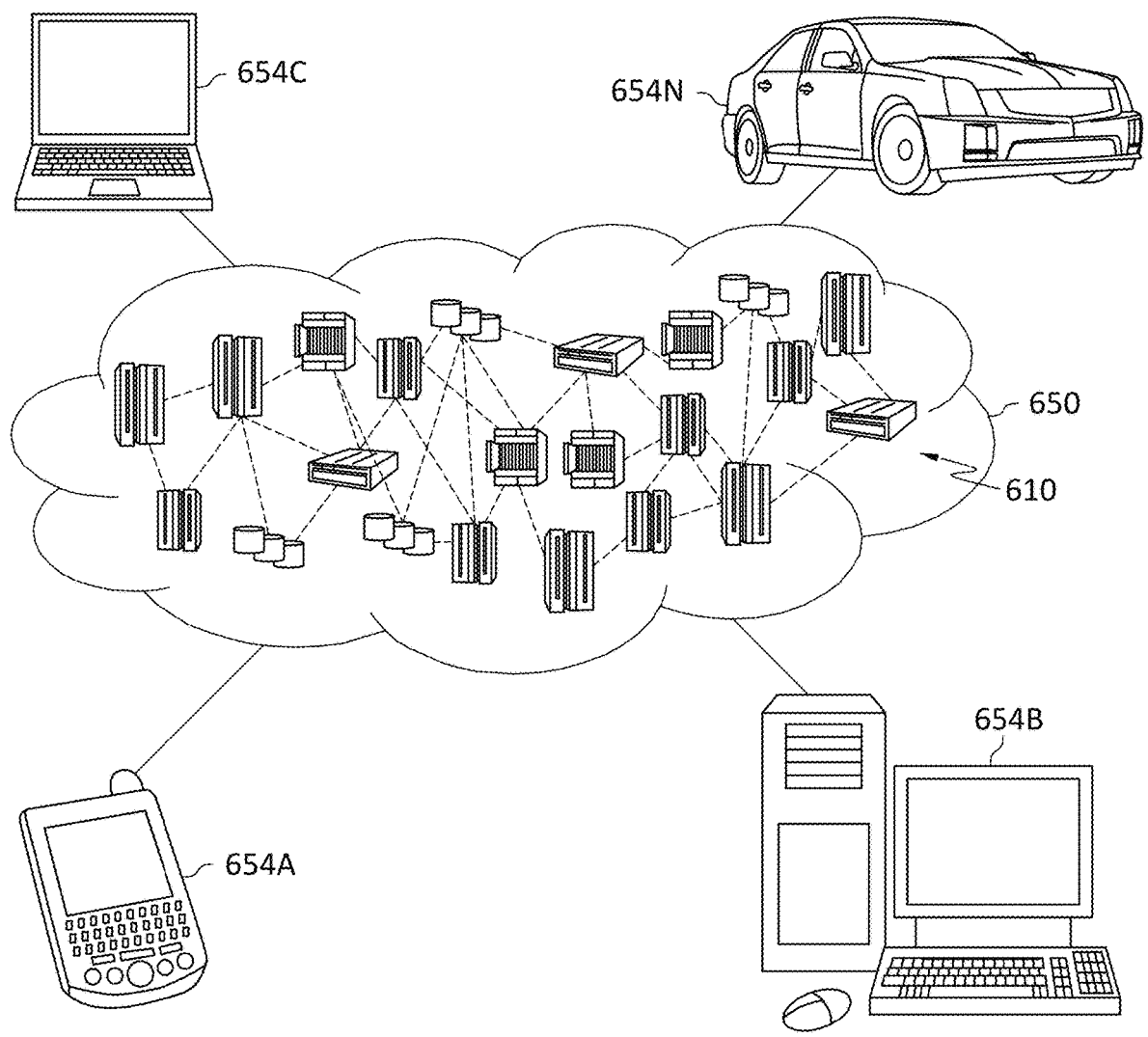
FIG. 8 is a block diagram of an illustrative cloud computing environment having one or more computing nodes with which local computing devices used by cloud customers to communicate, according to embodiments.

Referring now to FIG. 8, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 9:
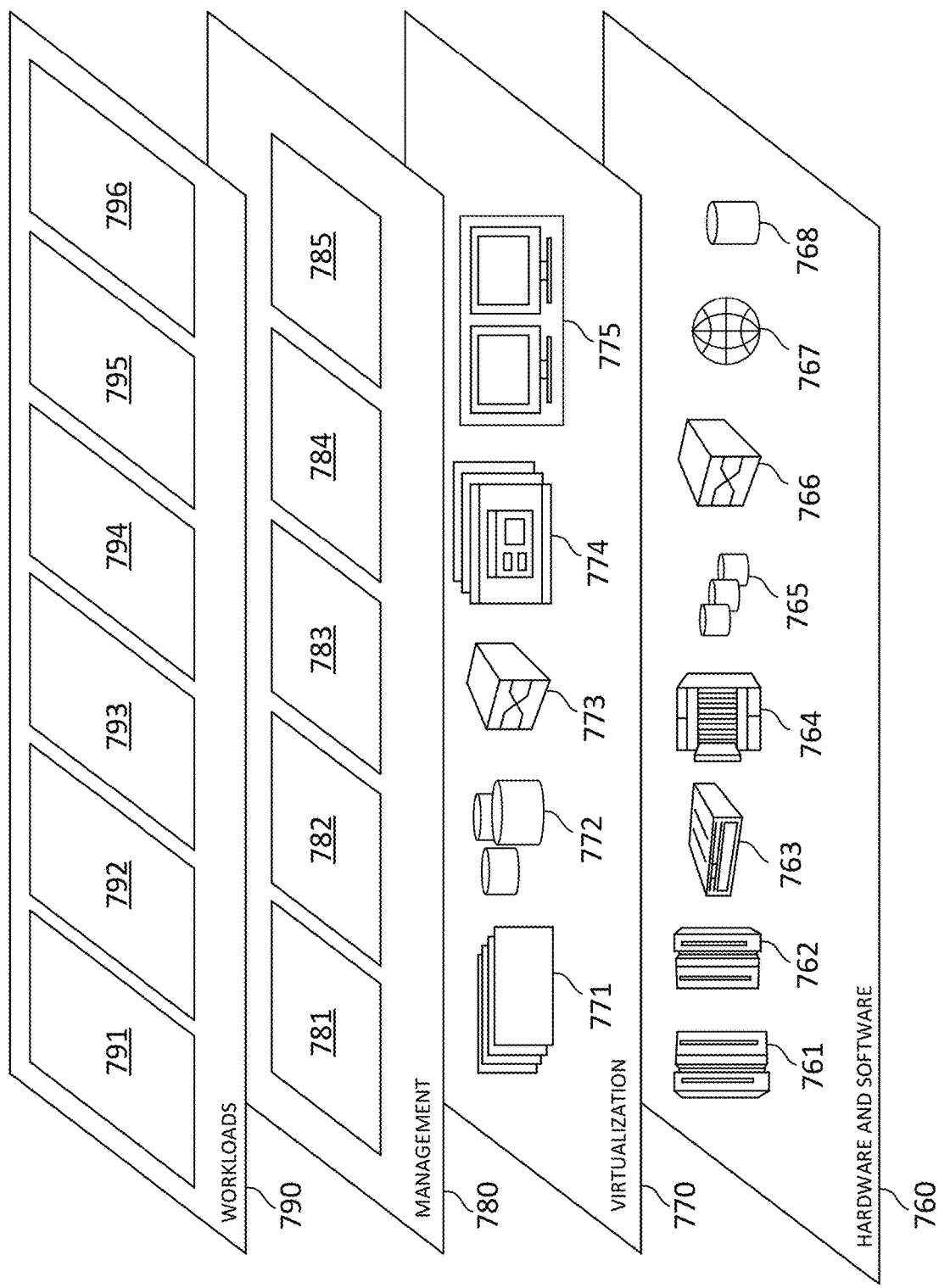
FIG. 9 is a block diagram of a set of functional abstraction layers provided by a cloud computing environment, according to embodiments.

Referring now to FIG. 9, a set of functional abstraction layers provided by cloud computing environment 650 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture-based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and neural network anomaly detection training processing 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for context aware anomaly detection, the method comprising:
   receiving a signal including real-time data;
   dividing the received signal into a set of training wavelets bounded by a respective training context;
   generating a prediction model for the training context by processing the set of training wavelets through a recurrent neural network to identify patterns in a sequence of data of a respective training wavelet;
   in response to execution of a current context that is different from the training context, extracting current wavelets from a signal of the current context;
   identifying a pairwise match between same dimensions of the current wavelets and a wavelet pattern of the prediction model by aligning sequences of the current wavelet and sequences of the wavelet pattern of the prediction model; and
   in response to determining that a total cumulative distance between the two sequences exceeds a predetermined threshold, identifying an anomaly.

2. The method of claim 1, wherein the real-time data is received from a plurality of data sources represented by a signal captured in real-time comprising n-dimensions, in which each dimension is representative of time series data collected.

3. The method of claim 2, wherein the n-dimensions include:
   a set of functions in a thread-dump;
   utilization of a CPU; and
   memory consumption.

4. The method of claim 1, wherein the training context is identified by phase changes during an application run using periodically collected snapshots.

5. The method of claim 4, wherein the phase changes are detected when there is a change between two consecutively collected snapshots of a program that exceeds a threshold change.

6. The method of claim 4, wherein a sliding window approach is utilized to detect the phase changes.

7. The method of claim 1, wherein identifying the pairwise match includes
   constructing, using d data points from each of the current wavelets, a d-by-d matrix in which each element of the matrix corresponds to a squared distance, $d(t_i, p_j)=(t_i, p_j)^2$, representing an alignment between points $t_i$ and $p_j$, and
   identifying a best match between these two sequences by retrieving an optimal path through the d-by-d matrix that minimizes the total cumulative distance between the two sequences.

8. The method of claim 7, wherein the optimal path is retrieved through the matrix that minimizes a warping cost represented by $$DTW(T, P) = \min\left\{\sqrt{\sum_{k=1}^{K} w_k}\right\}$$

where, $w_k$ is a matrix element $(i,j)_k$ that also belongs to the k-th element of a warping path W, a contiguous set of matrix elements that represent a mapping between T and P.

9. The method of claim 8, wherein the warping path is determined using dynamic programming to evaluate a recurrence represented by $$\gamma(i,j)=d(t_i,p_j)+\min\{\gamma(i-1,j-1),\gamma(i-1,j),\gamma(i,j-1)\}$$

where $d(i,j)$ is the distance found in a current cell, and $\gamma(i, j)$ is a cumulative distance of $d(i, j)$ and minimum cumulative distances from three adjacent cells.

10. The method of claim 1, wherein the predetermined threshold is modifiable based on user input.

11. A computer program product for context aware anomaly detection, the computer program product comprising:
   one or more computer readable storage media, and program instructions collectively stored on the one or more computer readable storage media, the program instructions comprising:
   program instructions to receive a signal including real-time data;
   program instructions to divide the received signal into a set of training wavelets bounded by a respective training context;
   program instructions to generate a prediction model for the training context by processing the set of training wavelets through a recurrent neural network to identify patterns in a sequence of data of a respective training wavelet;
   program instructions to, in response to execution of a current context that is different from the training context, extract current wavelets from a signal of the current context;
   program instructions to identify a pairwise match between same dimensions of the current wavelets and a wavelet pattern of the prediction model by aligning sequences of the current wavelet and sequences of the wavelet pattern of the prediction model; and
   program instructions to identify an anomaly in response to determining that a total cumulative distance between the two sequences exceeds a predetermined threshold.

12. The computer program product of claim 11, wherein the real-time data is received from a plurality of data sources represented by a signal captured at real-time comprising n-dimensions, in which each dimension is representative of time series data collected.

13. The computer program product of claim 12, wherein the n-dimensions include:
   a set of functions in a thread-dump;

utilization of a CPU; and memory consumption.

14. The computer program product of claim 11, wherein the training context is identified by phase changes during an application run using periodically collected snapshots.

15. The computer program product of claim 14, wherein the phase changes are detected when there is a change between two consecutively collected snapshots of a program that exceeds a threshold change.

16. The computer program product of claim 14, wherein a sliding window approach is utilized to detect the phase changes.

17. The computer program product of claim 11, wherein identifying the pairwise match includes
- constructing, using d data points from each of the current wavelets, a d-by-d matrix in which each element of the matrix corresponds to a squared distance, $d(t_i, p_j)=(t_i, p_j)^2$, representing an alignment between points $t_i$ and $p_j$, and
- identifying a best match between these two sequences by retrieving an optimal path through the d-by-d matrix that minimizes the total cumulative distance between the two sequences.

18. The computer program product of claim 11, wherein the predetermined threshold is modifiable based on user input.

* * * * *